(12) United States Patent
Hoshii et al.

(10) Patent No.: US 7,903,305 B2
(45) Date of Patent: Mar. 8, 2011

(54) IMAGE PROCESSING APPARATUS AND IMAGE PROCESSING METHOD

(75) Inventors: Jun Hoshii, Yamagata-mura (JP); Yukimitsu Fujimori, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 253 days.

(21) Appl. No.: 12/049,138

(22) Filed: Mar. 14, 2008

(65) Prior Publication Data
US 2008/0225315 A1 Sep. 18, 2008

(30) Foreign Application Priority Data

Mar. 14, 2007 (JP) ................................ 2007-064540

(51) Int. Cl.
*G03F 3/08* (2006.01)
*G06K 15/00* (2006.01)
*H04N 1/40* (2006.01)
*G06K 9/00* (2006.01)

(52) U.S. Cl. ........ 358/518; 358/1.18; 358/3.28; 382/181

(58) Field of Classification Search ................. 358/518, 358/1.18, 452, 3.28; 235/459, 462.09, 462.01, 235/462.04, 469; 382/181; 355/40, 535, 355/38, 41, 27, 28, 29; 396/599, 617, 620, 396/626, 312, 311; 704/270, 278, 272, 201
See application file for complete search history.

(56) References Cited

U.S. PATENT DOCUMENTS

| | | | | |
|---|---|---|---|---|
| 5,992,748 | A * | 11/1999 | Takahashi et al. | 235/462.04 |
| 6,130,961 | A | 10/2000 | Akioka et al. | |
| 6,204,935 | B1 | 3/2001 | Soma et al. | |
| 6,397,184 | B1 * | 5/2002 | Walker | 704/270 |
| 6,583,852 | B2 * | 6/2003 | Baum et al. | 355/40 |
| 2006/0290984 | A1 * | 12/2006 | Maeda | 358/1.18 |

FOREIGN PATENT DOCUMENTS

| | | |
|---|---|---|
| JP | 08-032827 | 2/1996 |
| JP | 10285416 A | 10/1998 |
| JP | 08077376 A | 3/2001 |
| JP | 2001-118064 | 4/2001 |
| JP | 2002010093 A | 1/2002 |
| JP | 2003-234916 | 8/2003 |

* cited by examiner

Primary Examiner — Charlotte M Baker
(74) Attorney, Agent, or Firm — DLA Piper LLP (US)

(57) ABSTRACT

An image processing apparatus, include: a first reader, operable to read image data; a second reader, operable to read a first image in which a correction content is described, the first image and a second image to which the correction content is performed are included in a medium; and a corrector, operable to correct the read image data in accordance with the correction content described in the first image.

15 Claims, 15 Drawing Sheets

SAMPLE IMAGE No OO

WORK HAVING IMPRESSION OF UNIQUE COLORATION
PARTICULARLY, RED COLOR TINGED WITH SLIGHTLY YELLOWISH COLOR HAS GREAT FEELING OF PRESENCE.

PICTURE DRAWING CODE

FIG. 8
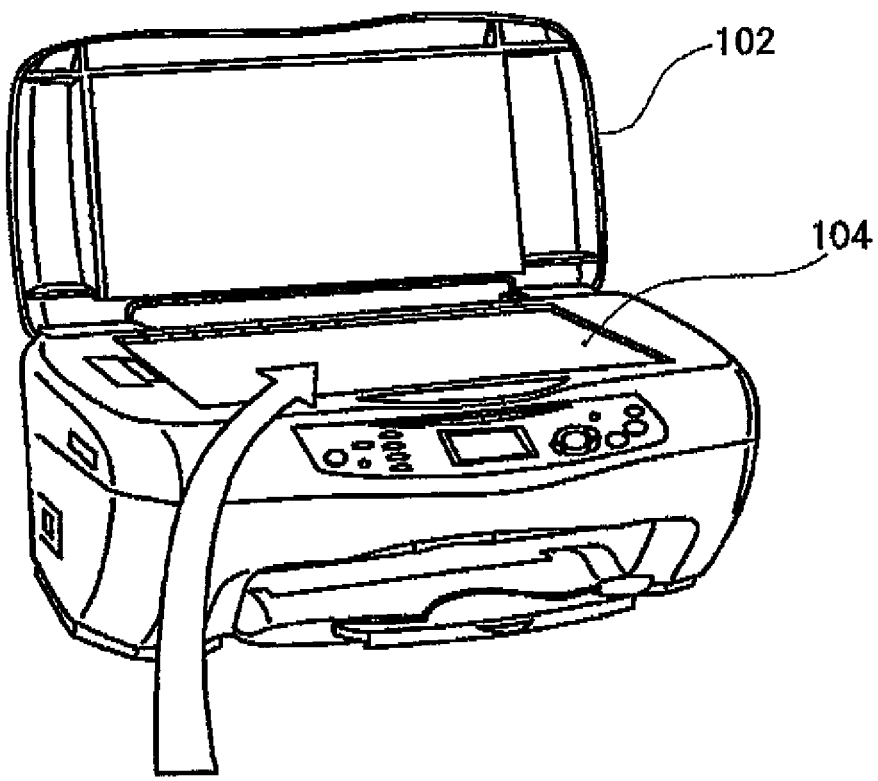

FIG. 9A
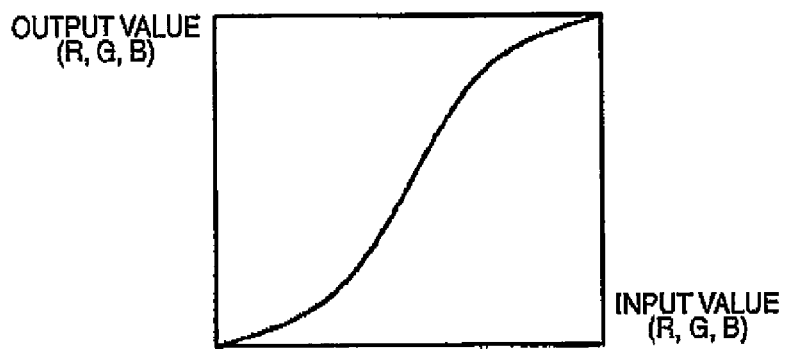
FIG. 9B
| | HUE (H) CORRECTING AMOUNT | SATURATION (S) CORRECTING AMOUNT | BRIGHTNESS (B) CORRECTING AMOUNT |
|---|---|---|---|
| −20° < H < 20° | +10° | +5 | +10 |
FIG. 9C
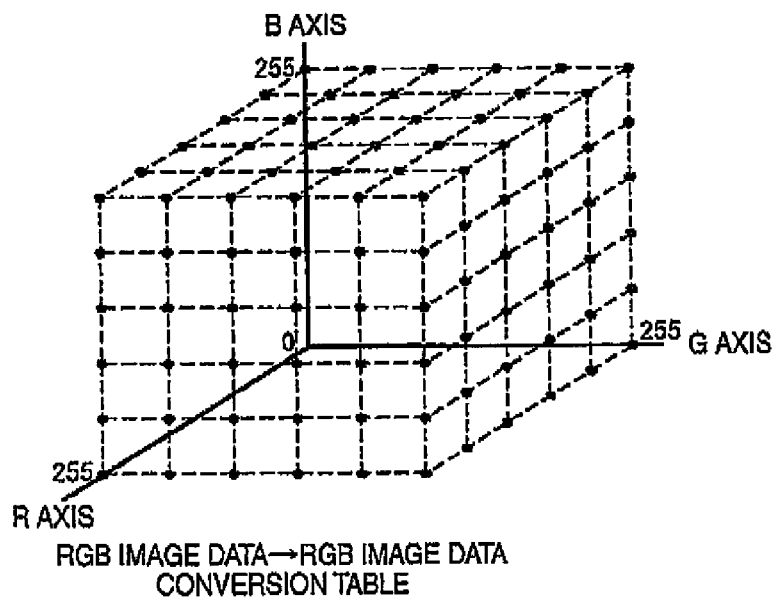
RGB IMAGE DATA→RGB IMAGE DATA
CONVERSION TABLE

FIG. 12
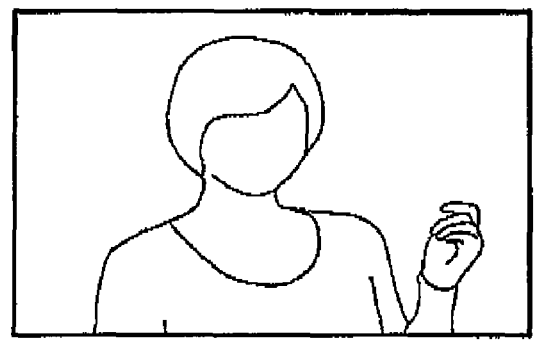
ORIGINAL RGB IMAGE DATA
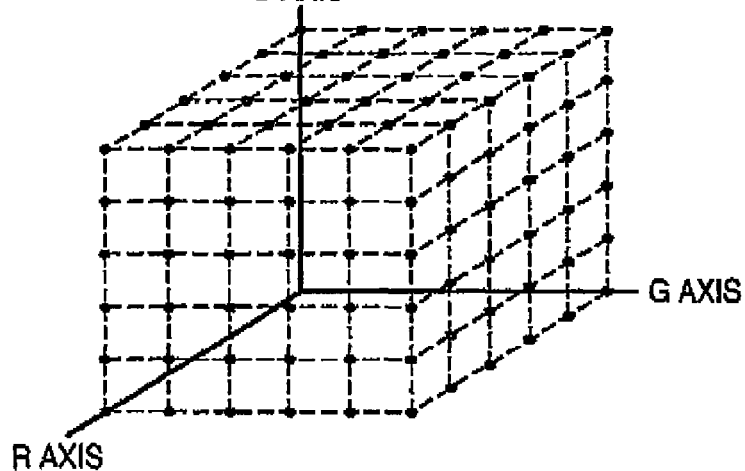
COLOR CONVERSION TABLE SET CORRESPONDING TO PICTURE DRAWING
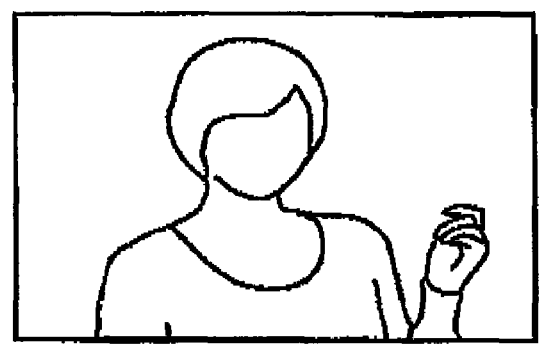
CMYK IMAGE DATA SUBJECTED TO PICTURE DRAWING

IMAGE PROCESSING APPARATUS AND IMAGE PROCESSING METHOD

BACKGROUND

1. Technical Field

The present invention relates to a technique for carrying out a predetermined correction processing over image data and outputting the image data thus obtained.

2. Related Art

With the progress of a computer related technique, at present, it is possible to easily handle color image data. For example, in the case in which an image is photographed by means of a digital camera, the photographed image is stored as image data and the image data are selected and supplied to a printing apparatus if necessary. Consequently, it is possible to immediately print an image.

In the case in which the image is thus printed from the image data, moreover, the printing apparatus incorporates a technique for carrying out various correction and regulation processings for the image data and then printing the image in order to output a more suitable image. The technique includes a related-art technique (refer to JP-A-832827) for properly correcting a brightness, a contrast and a color balance of image data and outputting an image and a related-art technique (refer to Japanese Patent No-3319727) for shading off an image or causing a contour to stand out corresponding to a photographic target of the image, thereby regulating an impression of the image, for example.

Recently, there has also been proposed a related-art technique for causing a user to select a correction content by using a keyword which can be sensuously understood from a plurality of prestored corrections corresponding to a diversification of a taste in an image of a user, thereby enabling the diversified taste of the user to be dealt with (refer to JP-A-2003-234916).

However, the type of corrections to be prestored also has a limitation. For this reason, there is a problem in that it is hard to deal with tastes of all users. In a rough selection using a keyword, moreover, there is restricted a distinction of a fine difference in a correction to select a more proper correction content. Furthermore, it is necessary to prestore the correction content. Therefore, there is also a problem in that a great deal of labor is required to prepare for the correction content in addition to a memory capacity for storage.

SUMMARY

An advantage of some aspects of the invention is to provide a technique capable of easily correcting an image into a favorite picture of a user and outputting the same picture.

According to an aspect of the invention, there is provided an image processing apparatus, comprising:

a first reader, operable to read image data;

a second reader, operable to read a first image in which a correction content is described, the first image and a second image to which the correction content is performed are included in a medium; and a corrector, operable to correct the read image data in accordance with the correction content described in the first image.

The present disclosure relates to the subject matter contained in Japanese patent application No. 2007-064540 filed on Mar. 14, 2007, which is expressly incorporated herein by reference in its entirety.

BRIEF DESCRIPTION OF THE DRAWINGS

The invention will be described with reference to the accompanying drawings, wherein like numbers reference like elements.

FIG. 8 is an explanatory view showing a state in which a user sets a picture drawing code onto a scanner portion in the picture drawing processing according to the example.

FIGS. 9A, 9B and 9C are explanatory views illustrating picture drawing information recorded on the picture drawing code.

FIG. 12 is an explanatory view conceptually showing a state in which the picture drawing is carried out according to the first variant.

DESCRIPTION OF EXEMPLARY EMBODIMENTS

In order to make the content of the invention clear, an example will be described below in the following order.

Figure 1:
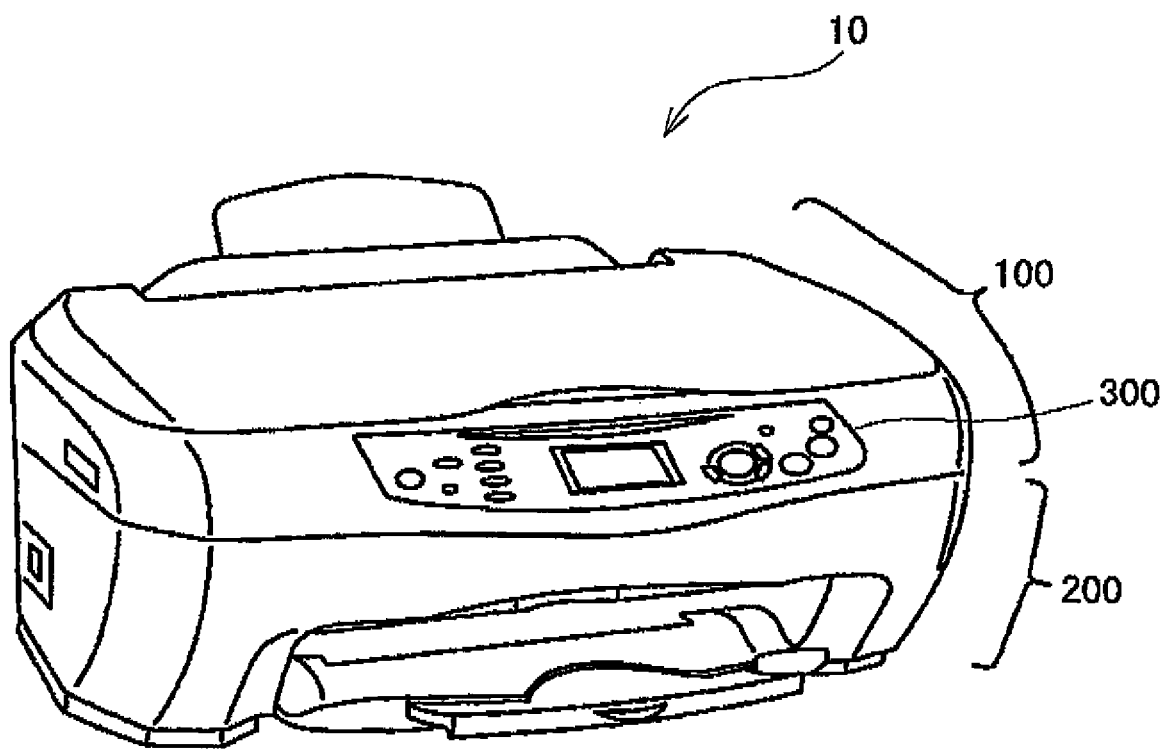
FIG. 1 is a perspective view showing a shape of an appearance of a printing apparatus according to the example.

A. Structure of Apparatus:
A-1. Whole Structure:
A-2. Internal Structure:
A-2-1. Internal structure of Scanner Portion:
A-2-2. Internal Structure of Printer Portion:
B. Image Print Processing:
C. Picture Drawing Processing:
D. First Variant:
E. Second Variant:
F. Third Variant:
A. Structure of Apparatus:
A-1. Whole Structure:

FIG. 1 is a perspective view showing a shape of an appearance of a printing apparatus 10 according to the example.

As shown in FIG. 1, the printing apparatus 10 according to the example is constituted by a scanner portion 100, a printer portion 200, and an operation panel 300 for setting operations of the scanner portion 100 and the printer portion 200. The scanner portion 100 has a scanner function for reading a printed image to generate image data. The printer portion 200 has a printer function for printing an image on a print medium upon receipt of image data. If an image (an original image) read through the scanner portion 100 is output from the printer portion 200, moreover, it is also possible to implement a copy function. More specifically, the printing apparatus 10 according to the example serves as a so-called scanner-printer-copy composite apparatus (which will be hereinafter referred to as an SPC composite apparatus) which can singly implement a scanner function, a printer function and a copy function.

Figure 2:
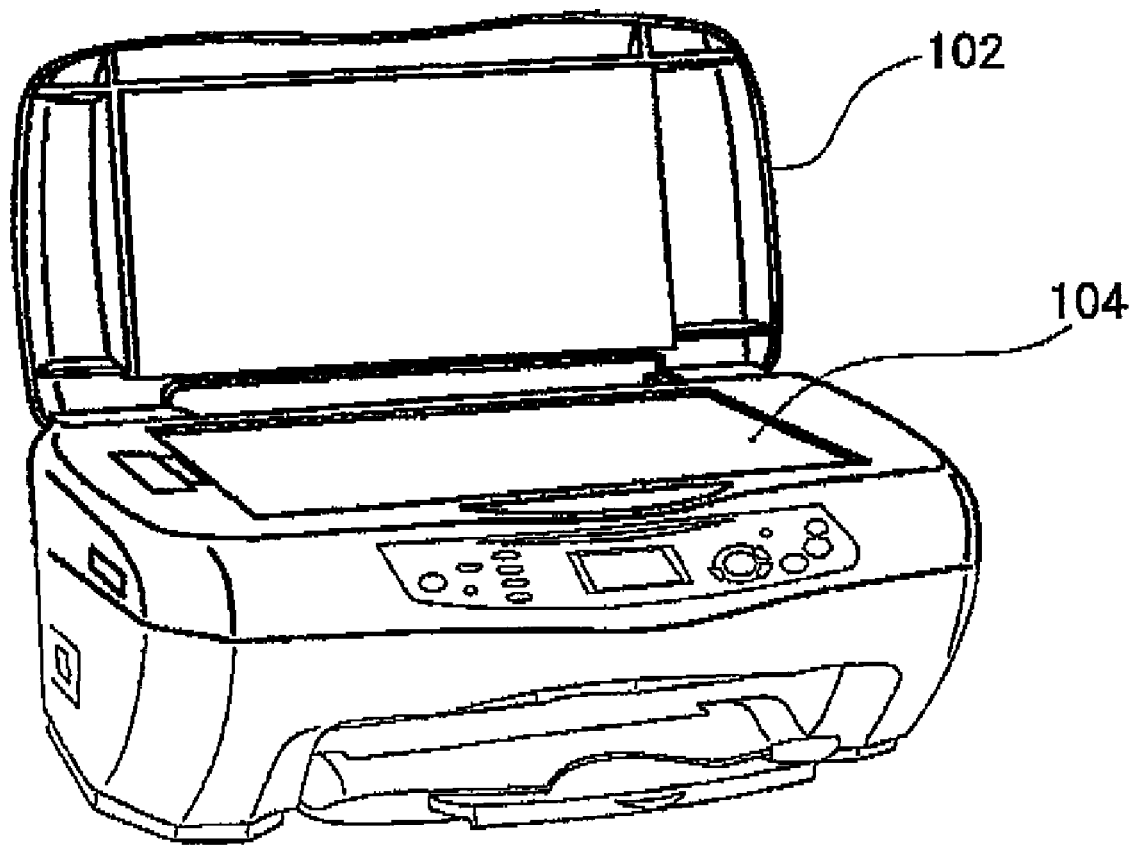
FIG. 2 is an explanatory view showing a state in which a platen cover provided in an upper part of the printing apparatus is opened to read an original image.

FIG. 2 is an explanatory view showing a state in which a platen cover 102 of the scanner portion 100 in the a printing apparatus 10 is opened. As shown in FIG. 2, in the state in which the platen cover 102 is opened, a transparent platen glass 104 is provided and includes various functions for implementing the scanner function which will be described below. When an original image is to be read, the platen cover 102 is closed as shown and a button provided on the operation panel 300 is then operated. Thus, it is possible to immediately convert the original image into image data.

Figure 3:
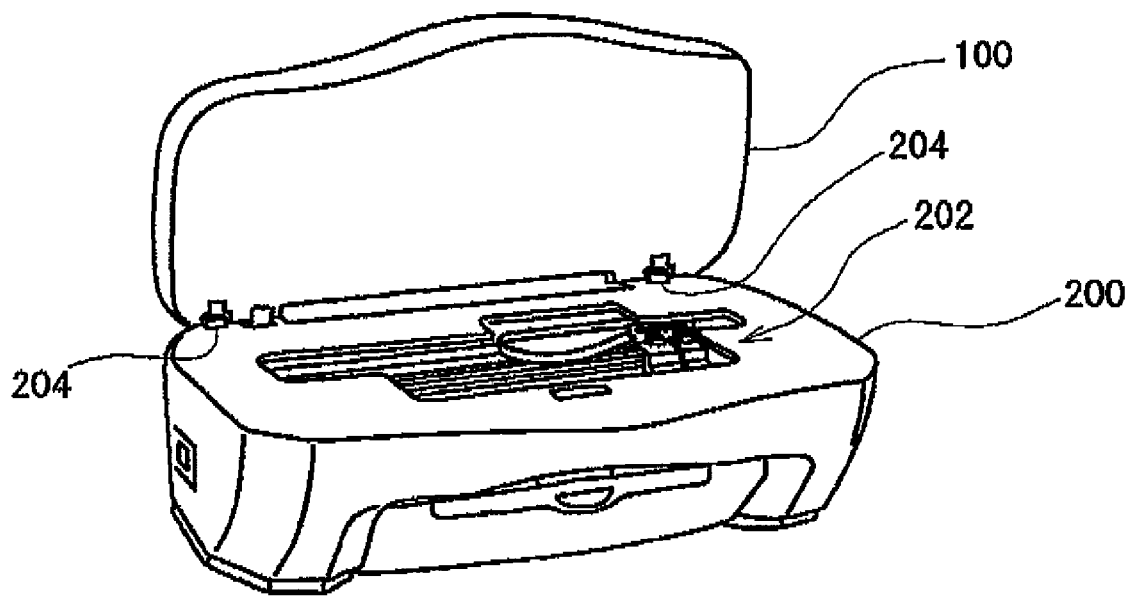
FIG. 3 is a perspective view showing a state in which near side of a scanner portion is lifted and rotated.

FIG. 3 is a perspective view showing a state in which near side of the scanner portion 100 in the printing apparatus 10 is lifted and rotated. As shown in FIG. 3, when the scanner portion 100 is lifted, an upper surface of the printer portion 200 can be exposed. The printer portion 200 includes various mechanisms for implementing the printer function which will be described below, a control circuit 260 which will be described blow, and a power circuit (not shown). As shown in FIG. 3, moreover, an opening portion 202 is provided on the upper surface of the printer portion 200, and it is easy to exchange expendable items such as an ink cartridge and to carry out a processing of eliminating a paper jam and other slight repairs.

Figure 4:
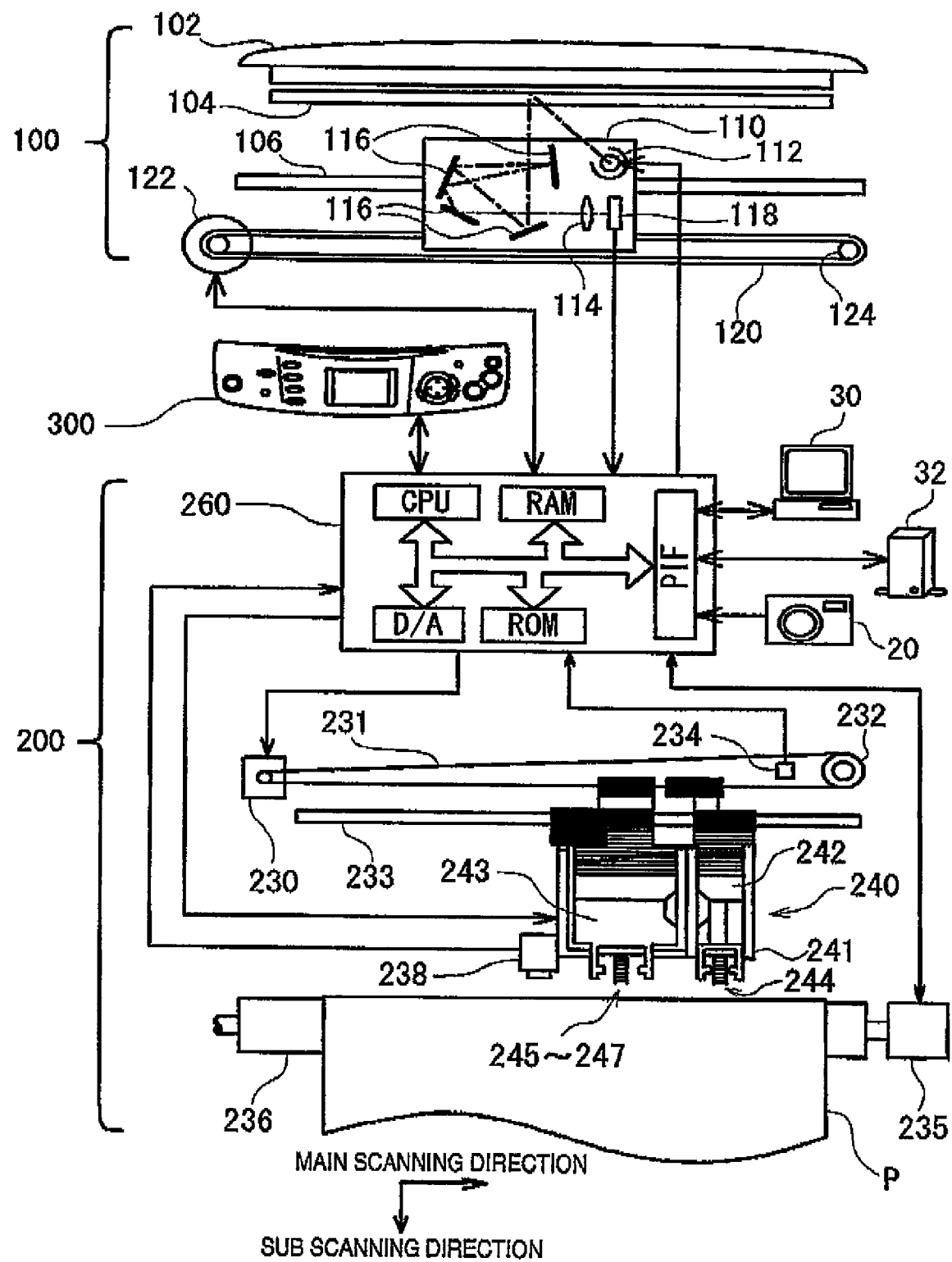
FIG. 4 is an explanatory view conceptually showing an internal structure of the printing apparatus according to the example.

A-2. Internal Structure:

FIG. 4 is an explanatory view conceptually showing an internal structure of the printing apparatus 10 according to the example. As described above, the printing apparatus 10 is provided with the scanner portion 100 and the printer portion 200, and various structures for implementing the scanner function are loaded into the scanner portion 100 and various structures for implementing the printer function are loaded into the printer portion 200. Moreover, the various structures are connected to the control circuit 260 and are properly controlled by the control circuit 260 so that the scanner function and the printer function can be implemented.

The control circuit 260 is constituted by an ROM, an RAM, a D/A converter for converting digital data into an analog signal, and furthermore, a peripheral device interface PIF for transferring data together with a peripheral device with a CPU as a main device. Moreover, the control circuit 260 is also connected to the operation panel 300 so as to enable the data transfer. By operating various buttons provided on the operation panel 300, it is possible to set detailed operation modes of the scanner function and the printer function. In addition, it is also possible to set the detailed operation modes through the peripheral device interface PIF by a computer 30.

A-2-1. Internal Structure of Scanner Portion:

The scanner portion 100 is constituted by the transparent platen glass 104 for setting an original image thereto, a reading carriage 110 loading an optical system such as a light source 112 and a collecting lens 114 thereto, and a driving motor 122 for moving the reading carriage 110 along the original image. When reading the original image, it is possible to obtain image data corresponding to the original image by irradiating a light of the light source 112 on the original image and measuring an intensity of a light reflected by the original image through a CCD 118 while moving the reading carriage 110 along the original image. Moreover, the light source 112 is constituted by a light emitting diode having three colors of R, G and B, and the CCD 118 can read RGB color image data by detecting a light reflected for each of the colors R, G and B.

A 2-2. Internal Structure of Printer Portion:

The printer portion 200 is constituted by a print carriage 240 onto which each of C, M, Y and K inks is loaded, a carriage motor 230 for moving the print carriage 240 along a print medium, and a paper feed motor 235 for feeding a paper to be the print medium. A ink discharging head for discharging an ink droplet is provided for each of the inks having the respective colors (ink discharging heads 244 to 247) at a bottom face side of the print carriage 240, and the ink droplet is discharged in accordance with a control signal sent from the control circuit 260. When an image is to be printed, the ink droplet is discharged from the ink discharging head while the print carriage 240 is moved. Consequently, an ink dot is formed on the print medium to print an image.

By driving the ink discharging heads for the respective colors to form the ink dots having the respective colors on the print medium, thus, the printer portion 200 of the printing apparatus 10 prints an image. Control data for driving the ink discharging heads are generated by carrying out a predetermined image processing over image data prior to the print of the image. Description will be given to a processing of carrying out an image processing over image data to generate control data and forming an ink dot based on the control data thus obtained, thereby printing an image.

Figure 5:
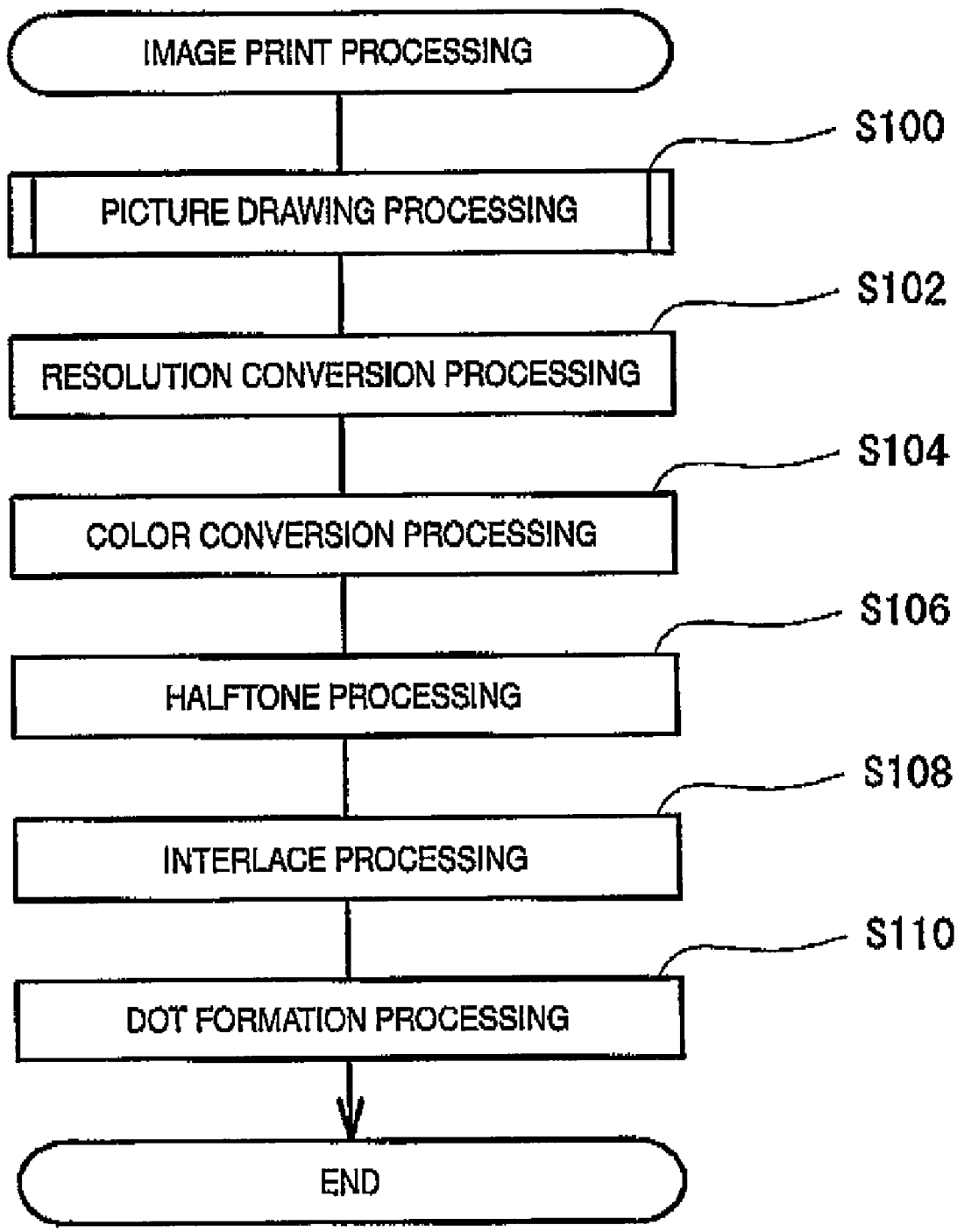
FIG. 5 is a flowchart showing a flow of a processing of executing a print through a printer driver (an image print processing).

B. Image Print Processing:

FIG. 5 is al flowchart showing a flow of a processing of executing a print by a printer driver (an image print processing). The processing is executed by using the functions of the CPU, the RAM and the ROM which are provided in the control circuit 260 loaded onto the printing apparatus 10 through the control circuit 260. Description will be given in accordance with the flowchart of FIG. 5.

As shown in FIG. 5, when the image print processing is started, a "picture drawing processing" for carrying out picture drawing corresponding to a taste of a user is first executed (Step S100). It is assumed that the "picture drawing" implies various whole correction and regulation processings to be carried out over the image data in an output of an image.

For example, it is assumed that the "picture drawing" includes a brightness correction processing of correcting an image to have a proper brightness and a white balance regulation processing of regulating a rate of each of the colors R, G and B to obtain an image having a more proper coloration. As a matter of course, the "picture drawing" also includes a so-called fine regulation of an image which is carried out to appeal to a sensibility in addition to a general correction processing.

For the picture drawing, in a related-art printing apparatus, so-called standard picture drawing which is suitable to all tastes is preset to print an image with which many possible users are satisfied, and picture drawing is executed in accordance with the set to print an image. However, the taste in the picture drawing is diversified by the user. For this reason, some users want to print an image through picture drawing which is more coincident with his (her) own taste. In this case, it is necessary for the user to carry out a complicated work for starting a PC to boot photoretouching software, correcting image data and then printing an image. Also in the case in which the photoretouching software is used, moreover, an advanced knowledge for an image correction and a chromatography is required for the picture drawing. Therefore, it is not very easy for general users to really carry out the picture drawing. Furthermore, the so-called picture drawing which appeals to a sensibility is partly close to art. Even if any multifunctional photoretouching software is used, desirable picture drawing cannot be implemented. In consideration of this respect, in the example, a special "picture drawing processing" is carried out to easily enable the user to perform desirable picture drawing, and furthermore, to readily obtain a print image for favorite picture drawing without executing a complicated work. The details of the picture drawing processing will be described below.

Subsequently, there is executed a processing of converting a resolution of image data subjected to the picture drawing processing into a resolution (a print resolution) for causing the printer portion 200 to carry out printing (Step S102). If a resolution of read image data is lower than the print resolution, an interpolating calculation is carried out over adjacent pixels to set new image data and the resolution is thus converted into a higher resolution. To the contrary, if the resolution of the read image data is higher than the print resolution, the image data are thinned out at a certain rate from the adjacent pixels. Thus, the resolution is converted into a lower resolution. In the resolution conversion processing, the image data are generated or thinned out at a proper rate with respect to the read image data and the read resolution is thus converted into the print resolution.

Next, the control circuit 260 of the printing apparatus 10 carries out a color conversion processing for the image data (Step S104). The color conversion processing serves to convert image data (RGB image data) represented by respective colors of R, G and B into image data (CMYK image data) represented by gradation values for respective colors C, M, Y and K. The color conversion processing is carried out by referring to a three-dimensional mathematical table which is referred to as a color conversion table (LUT). The color conversion table stores the RGB image data and the CMYK image data correspondingly, and the RGB image data can be rapidly converted into the CMYK image data by referring to the color conversion table.

When the color conversion processing is ended, the control circuit 260 starts a halftone processing (Step S106 in FIG. 5). As described above, the printer portion 200 forms a dot to print an image. However, the CMYK image data obtained by the color conversion processing are represented within a range of gradation values of 0 to 255 for the respective colors C, M, Y and K. Therefore, the control circuit 260 carries out the halftone processing, thereby converting the CMYK image data represented by the 256 gradations into image data (dot data) represented through the presence of the formation of the dot.

When the halftone processing is carried out to generate the dot data for the respective colors C, M, Y and K, a processing (an interlace processing) of rearranging the dot data in order in which a printing head 241 forms a dot is then executed (Step S108). Thereafter, a processing (a dot formation processing) of forming a dot onto the print medium is actually started in accordance with the rearranged dot data (Step S110). More specifically, the carriage motor 230 is driven to primarily scan the print carriage 240, and at the same time, supplies the dot data having order rearranged to the ink discharging heads 244 to 247. As a result, ink droplets are discharged for the ink discharging heads 244 to 247 in accordance with the dot data so that dots are formed properly on the respective pixels.

When one primary scan is ended, the paper feeding motor 235 is then driven to feed the print medium in a sub scanning direction. Thereafter, the carriage motor 230 is driven to primarily scan the print carriage 240, and at the same time, supplies the dot data having the order rearranged to the ink discharging heads 244 to 247, thereby forming dots. By repetitively carrying out the operation, the dots having the respective colors of C, X, Y and K are formed on the print medium in a proper distribution corresponding to the gradation values of the image data. As a result, an image is printed.

As described above, in the image print processing, a predetermined processing is sequentially carried out over the received image data and the ink dot is thus formed on the print medium based on the dot data thus obtained so that the printed image is output. Because of the "picture drawing processing" carried out in the image print processing, it is possible to output the printed image through the favorite picture drawing of the user.

C. Picture Drawing Processing:

Description will be given to the picture drawing processing according to the example which is to be carried out in the image print processing. In the picture drawing processing according to the example, it is possible to easily carry out the picture drawing by selecting a favorite one of a large number of sample images which are prepared in advance in order to cause a general user to readily carry out a favorite picture drawing processing.

Figure 6:
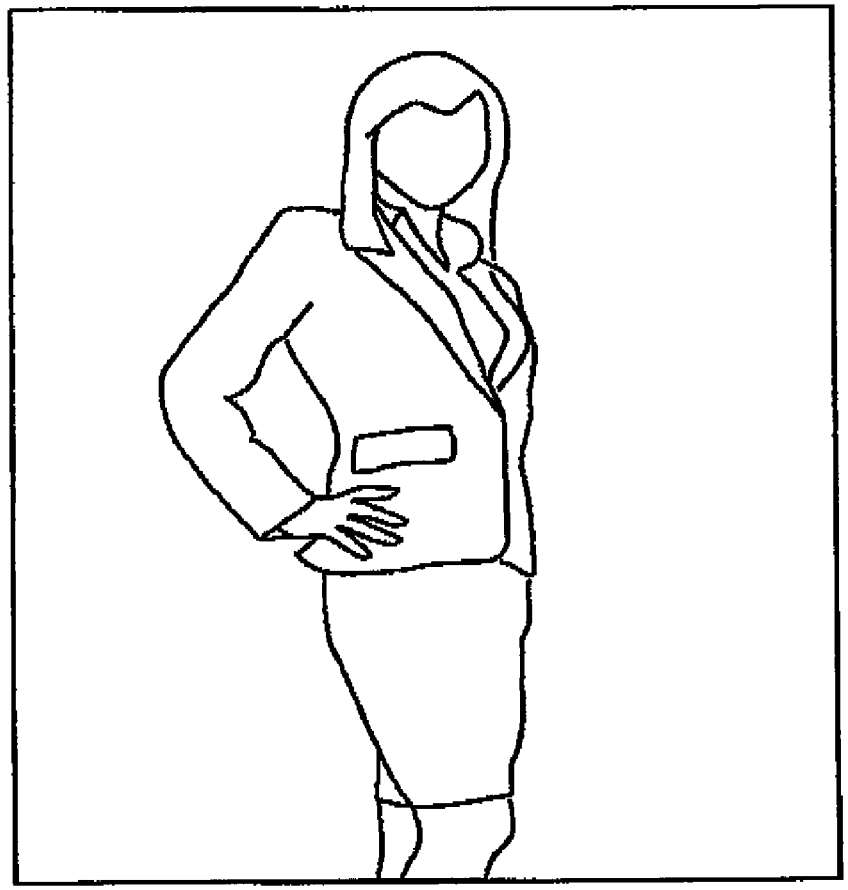
FIG. 6 is an explanatory view illustrating a sample image to be used in the example.

FIG. 6 is an explanatory view illustrating a sample image which is prepared in advance. As shown in FIG. 6, a two-dimensional bar code is printed together with the sample image, and the content of a picture drawing processing carried out over the sample image is recorded on the two-dimensional bar code in a coded state (in other words, a state in which people cannot directly decode the content). A graphic having the content of the picture drawing processing coded and recorded will be hereinafter referred to as a "picture drawing code". In the example, a user previously selects a favorite one of the sample images in order to print an image. The picture drawing processing is carried out in the following manner.

Figure 7:
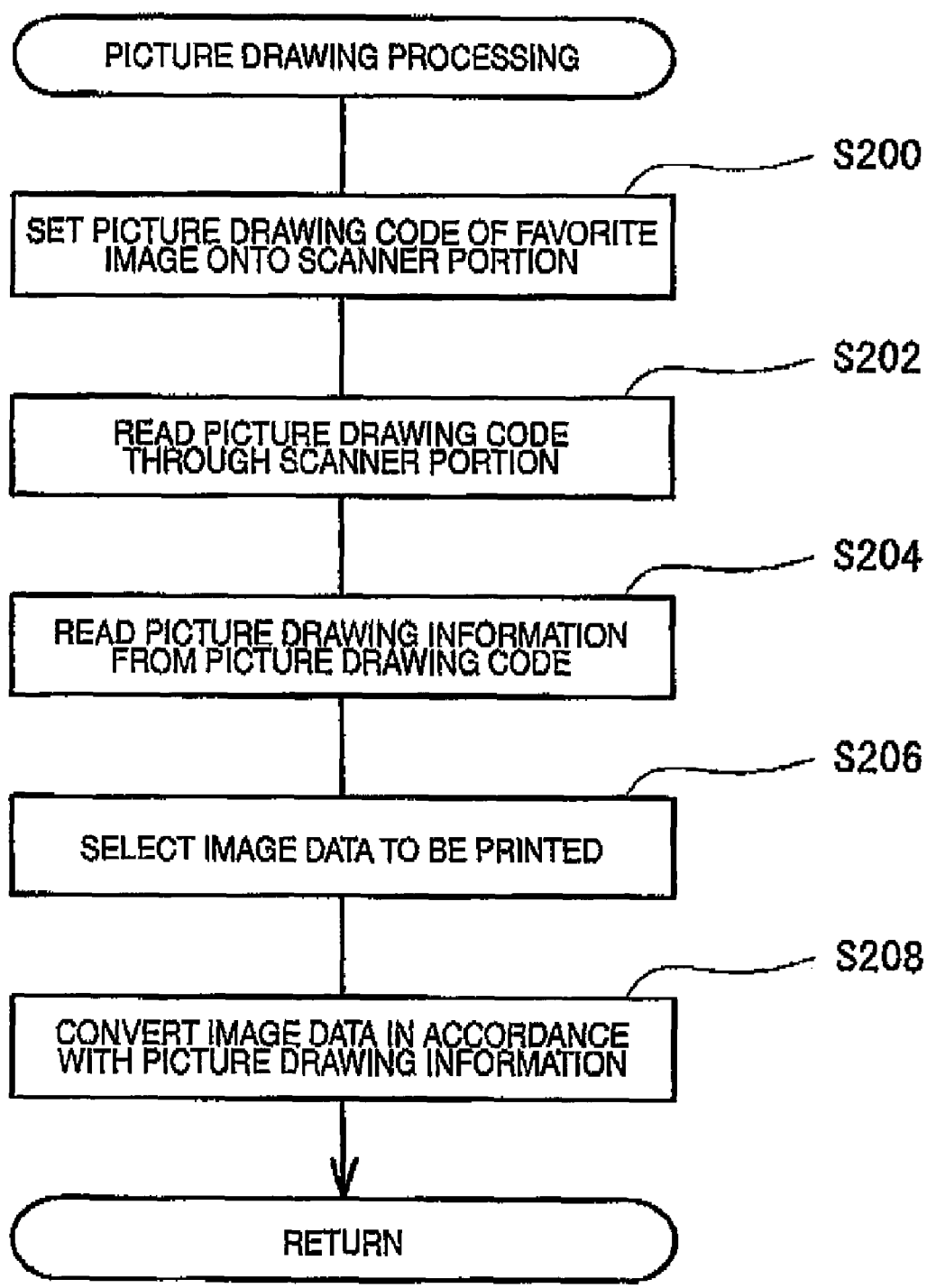
FIG. 7 is a flowchart showing a flow of a picture drawing processing according to the example.

FIG. 7 is a flowchart showing a flow of the picture drawing processing to be carried out in the image print processing according to the example. When the picture drawing processing is started, a picture drawing code of a sample image selected by the user is first set onto the scanner portion 100 of the printing apparatus 10 according to the example (Step S200).

FIG. 8 is an explanatory view illustrating a state in which the user sets the picture drawing code onto the scanner portion 100. When the platen cover 102 of the scanner portion 100 is lifted, the picture drawing code portion of the sample image is mounted on the platen glass 104 and the platen cover 102 is then closed as shown in FIG. 8, the picture drawing code can be set onto the scanner portion 100. Subsequently, the user manipulates the operation panel 300 to cause the scanner portion 100 to carry out a reading operation (Step S202 in FIG. 7). As described above, the scanner portion 100 irradiates a light having each of the colors R, G and B on an original and detects a reflected light through the CCD 118 to acquire the original as RGB image data.

When the reading operation of the scanner portion 100 is ended, the control circuit 260 carries out a processing of detecting the picture drawing code from the image data acquired by the scanner portion 100 and reading a picture drawing content recorded thereon (picture drawing information) (Step S204).

The reason is that the picture drawing code is also acquired as a simple image in a stage in which the scanner portion 100 acquires the image data and the picture drawing code is to be first detected from the acquired image data in order to read the picture drawing information. A graphic for an alignment is incorporated into an ordinary two-dimensional code in addition to the picture drawing code. By detecting the graphic, therefore, it is possible to detect the picture drawing code in the image, thereby reading the picture drawing information.

FIGS. 9A to 9C are explanatory views illustrating the content of the picture drawing information recorded on the picture drawing code. As described above, the picture drawing information is related to picture drawing given to the sample image and is recorded in various manners corresponding to the picture drawing thus given. For example, the picture drawing information can be recorded in a manner of a tone curve shown in FIG. 9A. In the tone curve, an output value (each of the gradation values of R, G and B) indicated as an axis of ordinates is caused to correspond to an input value (each of the gradation values of R, G and B) indicated as an axis of abscissas. By converting the image data in accordance with the tone curve, it is possible to carry out predetermined picture drawing.

For the picture drawing information, moreover, it is also possible to take a manner for recording a correcting amount of each of a hue (H), a saturation (S) and a brightness (B) by using an HSB color system represented as the hue, the saturation and the brightness as shown in FIG. 9B. Even if picture drawing information recorded in this manner is used, it is possible to carry out predetermined picture drawing. For instance, in the example of FIG. 9B, it is possible to carry out a conversion into a slightly yellowish red color (vermilion color) by increasing a hue median by 10 degrees with respect to a color (the red color) having a hue value of −20 to +20 degrees. By increasing the saturation and the brightness, similarly, it is possible to carry out picture drawing having a bright and clear vermilion color.

As shown in FIG. 9C, furthermore, it is also possible to store the picture drawing information in a manner of a conversion table for converting images represented by gradation values (R, G and B values) for the respective colors of R, G and B into other R, G and B values. Referring to bluish picture drawing, for example, it is preferable to set a conversion table for converting the RGB values into other RGB values having a slightly great gradation value for the blue color. If the image data are converted in accordance with the conversion table, it is possible to draw a bluish picture by increasing the gradation value for the blue color.

As a matter of course, the picture drawing information is not restricted to that illustrated in FIGS. 9A to 9C but various information related to the picture drawing can be recorded as the picture drawing information. For example, in the case in which a sharpness of an image is regulated, it is also possible to set various filters such as the Gaussian filter. Moreover, it is also possible to set various parameters for a correction, for example, a target luminance value in the correction of the brightness. In the case in which an advanced correction processing of deciding a photographing target to correct an image (for example, a processing of detecting a face of a person and then correcting a skin color of the face into a proper color) is carried out, furthermore, it is also possible to set, as the picture drawing information, various parameters to be used for deciding the photographing target or various values such as a target color value to be used for the correction.

As described above, the picture drawing information can be recorded in various manners. At the Step S204 of FIG. 7, the picture drawing information recorded in the various manners are read from the picture drawing codes read at the Step S202.

when the picture drawing information is read, a processing of selecting image data to be printed is then carried out (Step S206). The image data may be stored in the computer 30 or an external storage device 32 or may be stored in a digital camera 20 connected to the printing apparatus 10. The user manipulates the operation panel 300 or the computer 30, thereby selecting any of the image data which are to be printed.

When the user selects the image data to be printed, a conversion processing is actually carried out over the selected image data in accordance with the picture drawing information read previously (Step S208). For example, if the picture drawing information which is read is represented by the tone cover shown in FIG. 5A, each of the gradation values of R, G and B of the image data is converted in accordance with the tone curve as described above. In the case in which the picture drawing information is represented by a correcting amount in the HSB color system as shown in FIG. 9B, moreover, it is preferable to convert the image data from the RGB color system into the HSB color system and to correct the hue, the saturation and the brightness through the HSB color system respectively and to then carry out a conversion from the HSB color system to the RGB color system again. Alternatively, if the picture drawing information is the conversion table shown in FIG. 9C, it is preferable to convert the RGB values of the image data into other RGB values in accordance with the conversion table.

By converting the image data in accordance with the picture drawing information, thus, it is also possible to give the image of the user the same picture drawing as that for the sample image because the picture drawing information has the content of the picture drawing given to the sample image.

Figure 10:
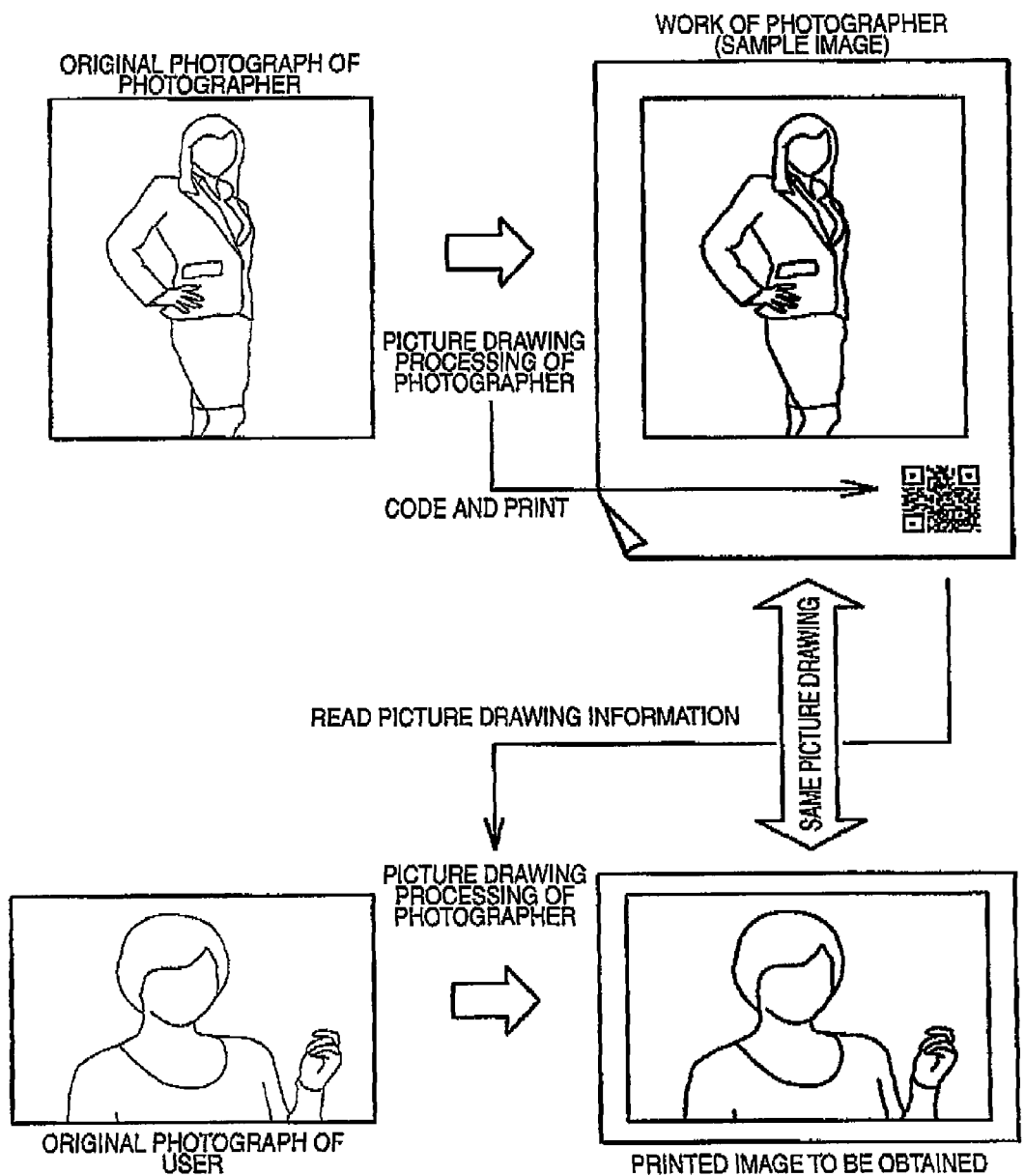
FIG. 10 is an explanatory view conceptually showing the reason why a sample image is utilized to carry out the picture drawing processing, thereby obtaining an image subjected to the picture drawing in the same manner as that carried out by a photographer or a designer.

Referring to FIG. 10, this respect will be described with a supplement.

In general, a photographer or a designer usually carries out various picture drawing processings, for example, regulates a brightness or a coloration of an image when finishing the image as his (her) own work. By the picture drawing processing, an image having a unique impression of the photographer or the designer is finished and a final work is completed. In the printing apparatus 10 according to the example, a characteristic work of the photographer or the designer is used as a sample image. Consequently, a general user can carry out the same picture drawing processing as that for the photographer or the designer, thereby outputting an image. On the assumption that the work of the photographer or the designer is used for the sample image, description will be given. It is possible to use any of images which are subjected to the picture drawing with a characteristic impression so as to cause the user to easily select them.

FIG. 10 is an explanatory view conceptually showing the reason why an image subjected to the same picture drawing as that for the photographer or designer is obtained through the execution of the picture drawing processing utilizing the sample image. An original photograph (which has not been subjected to the picture drawing processing) picked up by the photographer is shown in an upper left part of FIG. 10. The photographer carries out a unique picture drawing processing over image data of the photograph, thereby completing an image to be a work having a unique impression. In the example, the image subjected to the picture drawing is used as the sample image and a picture drawing code recording the content of the picture drawing given to the image is printed on the sample image together. A sample image in which the image subjected to the picture drawing and the picture drawing code are printed together is illustrated in an upper right part of FIG. 10.

The content (picture drawing information) recorded in the picture drawing code includes a parameter which can be implemented by using a so-called retouching software, for example, a tone curve for carrying out a gradation conversion or a parameter for performing a color conversion. In the case in which the image data are converted by using the parameters, however, it is hard for a general user having neither a special knowledge nor an experience to imagine an image having any impression. On the other hand, it is possible to recognize an impression of the sample image at a glance. The picture drawing code is also printed on the sample image. If a sample image having a preferable impression is selected, therefore, it is possible to acquire a content (picture drawing information) of picture drawing given to obtain the image. More specifically, the picture drawing information is not directly selected but is indirectly selected through the sample image. Consequently, a user having neither a special knowledge nor an experience can select proper picture drawing information including a very small difference.

When the sample image is selected and the picture drawing information about the sample image is acquired, thus, the picture drawing processing is carried out in accordance with the picture drawing information which is acquired. Consequently, a general user can also output an image having the same impression as that of the photographer or designer.

For example, the picture drawing processing is carried out over an image photographed by the user as shown in a lower left part of FIG. 10 in accordance with the picture drawing information acquired from the sample image. A printed image thus obtained is shown in a lower right part of FIG. 10. The picture drawing processing carried out to obtain the printed image is the same as the picture drawing processing carried out to obtain a work of a sample image by the photographer.

As a matter of course, the printed image thus obtained also has the same impression as the work of the photographer (that is, the same picture drawing is executed).

In the sample image illustrated in FIG. 6 or 10, the picture drawing code and the sample image are printed on the same print paper. However, it is sufficient that the sample image and the picture drawing code correspond to each other and they do not need to be printed on the same print paper.

For example, when a photographical magazine provides a sample image, picture drawing codes of inserted works may be collectively printed at the end of the magazine. Also in this case, it is possible to carry out the same picture drawing processing as that for a work over the image of the user if the work and the picture drawing code correspond to each other.

Moreover, the number of the picture drawing codes corresponding to the sample image is not restricted to one but a plurality of picture drawing codes may correspond to the sample image. For example, in the case in which a data volume of the picture drawing information is large and is not completely stored in one picture drawing code, the picture drawing information is described through a division into a plurality of picture drawing codes. Consequently, picture drawing information having a large data volume can also be stored in the picture drawing codes. If the picture drawing codes are sequentially read by the scanner portion 100 to acquire the picture drawing information, the same picture drawing as that for the sample image can be given to the image of the user.

In the case in which the picture drawing codes correspond to the sample image, thus, all of the picture drawing codes are not used but a part thereof may be used for the picture drawing for the image of the user. For example, two picture drawing codes including a picture drawing code storing information about a brightness correction and a picture drawing code recording information about a contrast correction correspond to each other, and only the picture drawing code about a contrast of the sample image is used if the user feels that the contrast is preferred. Consequently, the user can obtain an image having the same contrast as the sample image.

As a matter of course, in the case in which the user feels that a brightness is preferred in addition to the contrast of the sample image, it is possible to obtain an image having the same brightness and contrast as the sample image by using the picture drawing code for the brightness correction and the picture drawing code for the contrast correction in combination. Furthermore, it is also possible to give the image data the picture drawing having a combination of the picture drawing processings for sample images by using the picture drawing code of the sample image and a picture drawing code of another sample image in combination.

In the picture drawing processing according to the example shown in FIG. 7, the picture drawing information is read from the picture drawing code of the sample image (Step S204) and the image data to be printed are then selected (Step S206), and the processing of converting the selected image data based on the picture drawing information is carried out (Step S208). Consequently, it is possible to easily execute the same picture drawing as that of a photographer or a designer.

When the image data are converted, then, the picture drawing processing of FIG. 7 is ended and the image print processing shown in FIG. 5 is then returned, and the resolution conversion processing (step S102), the color conversion processing (Step S104), the halftone processing (Step S106) and the interlace processing (step S108) are carried out and a dot is thereafter formed (Step S110) so that a printed image is output.

As described above, in the printing apparatus 10 according to the example, the picture drawing code printed together with a work of a photographer is read and used for the picture drawing to be given to an image of a user. Consequently, it is possible to output an image for favorite picture drawing of the user. In the print of the image, it is sufficient that the user simply sets, onto the scanner portion 100 of the printing apparatus 10, a picture drawing code of a work that he (she) feels to be preferable. For this reason, any complicated operation does not need to be carried out and a knowledge related to the picture drawing is not required.

Also when a favorite work is to be selected, it is not necessary to be conscious of which picture drawing is given to the work but it is sufficient to make only a sensible decision whether the work is felt to be simply preferable or not. For this reason, the knowledge of the picture drawing and that of chromatology are not demanded at all. When the picture drawing is to be carried out, thus, any complicated operation and advanced knowledge are not required at all. Therefore, the user can obtain an image for his (her) own favorite picture drawing very easily.

In the example, furthermore, the picture drawing information is coded and recorded. Therefore, it is possible to record more information than that recorded in a manner which can be identified by people (a character). In addition, it is possible to record more information by carrying out the recording in a manner of a two-dimensional code. Consequently, it is possible to record detailed information about the picture drawing, thereby reproducing the picture drawing processing given to a sample image more faithfully.

Moreover, it is also possible to record, in the picture drawing code, information about an ink and a print paper which are used for printing a sample image or information about a type of a printing apparatus in addition to the information about the picture drawing, for example. Alternatively, it is also possible to record information about a profile or signature of a photographer. In this case, if the user is informed of a type of the print paper used for the sample image through a display on a display screen of the operation panel 300, for example, the user can print an image by using a proper print paper. Therefore, it is possible to avoid a situation in which an impression of the printed image is varied depending on the quality (a coloration or a gloss) of the print paper, thereby obtaining a more suitable printed image for the picture drawing. If the signature of the photographer is printed together with the image or the profile of the photographer is displayed on the display screen of the operation panel 300, moreover, the photographer can advertize himself (herself) and the user can know information about a favorite photographer, which is suitable.

D. First Variant:

In the image print processing described with reference to FIG. 5, the picture drawing processing (Step S100) is executed prior to the color conversion processing of converting the RGB image data into the CMYK image data (Step S104 in FIG. 5) to once convert the RGB image data into the RGB image data subjected to the picture drawing, and the color conversion processing is carried out over the RGB image data to generate the CMYK image data subjected to the picture drawing. By executing the processing of carrying out the picture drawing over the RGB image data and the processing of carrying out the conversion into the CMYK image data at the same time, however, it is also possible to directly generate the CMYK image data subjected to the picture drawing from the RGB image data. Description will be given to a first variant in which the picture drawing is carried out to print an image by the method.

Figure 11:
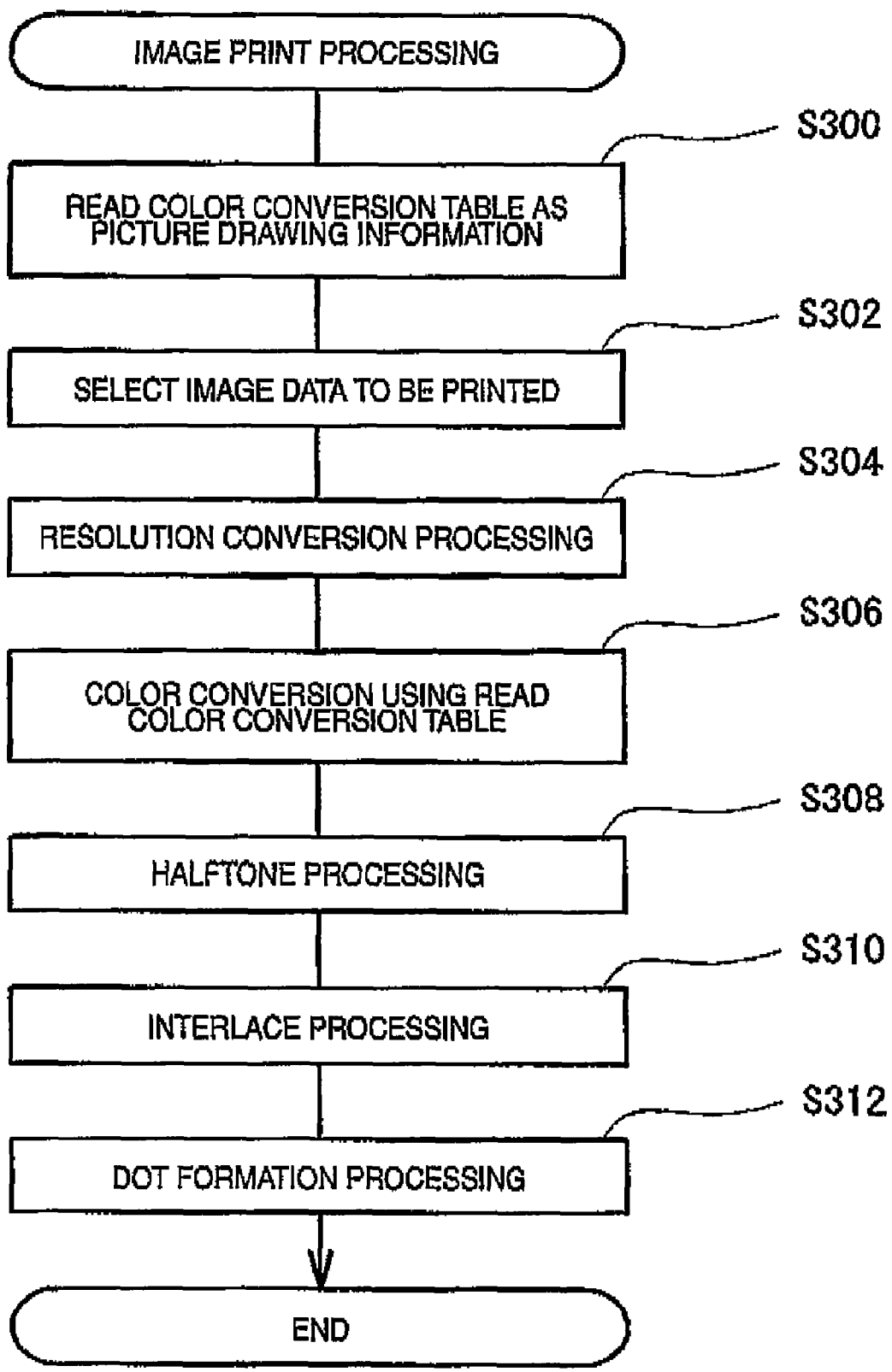
FIG. 11 is a flowchart showing a flow of an image print processing according to a first variant.

FIG. 11 is a flowchart showing a flow of an image print processing according to the first variant. As shown in FIG. 11, in the image print processing according to the first variant, a processing of reading a color conversion table as picture drawing information is first carried out (Step S300).

Also in the first variant in the same manner as in the example, when printing an image, a user previously selects a favorite one of sample images and first sets a picture drawing code of the selected sample image onto the scanner portion 100 at a start of the image print processing. Subsequently, the operation panel 300 is manipulated to cause the scanner portion 100 to carry out a reading operation. When the reading operation of the scanner portion 100 is ended, the control circuit 260 of the printing apparatus 10 detects a picture drawing code portion from image data acquired by the scanner portion 100 and reads picture drawing information which is recorded.

Although various conversion information for the RGB image data are recorded as the picture drawing information in the example (see FIGS. 9A to 9C), a color conversion table for carrying out a color conversion from the RGB image data to the CMYK image data is recorded as the picture drawing information in the first variant. In the first variant, it is possible to carry out a picture drawing processing and a color conversion processing at the same time by using the color conversion table read from the picture drawing code. This respect will be described with reference to FIG. 12.

FIG. 12 is an explanatory view conceptually showing a state in which the picture drawing is carried out in the first variant. As shown in FIG. 12, in the first variant, CMYK image data subjected to the picture drawing are directly generated from original RGB image data by referring to a special color conversion table which is set corresponding to the picture drawing to be given to an image. As described above, the color conversion table stores a set of gradation values of R, G and B and a set of gradation values of C, M, Y and K correspondingly.

In the color conversion table to be used in a normal color conversion processing, the RGB values and the CMYK values which represent the same colors are caused to correspond to each other in principle in such a manner that a coloration and a brightness of an image are not changed before and after a conversion. Also in the CMYK image data obtained after the conversion, consequently, it is possible to faithfully reproduce an original image.

On the other hand, in the color conversion table used in the first variant, the RGB values are stored corresponding to other CMYK values for slightly different colors depending on the picture drawing to be given to an image. For example, in the case in which a picture having a slightly bluish image is to be drawn, a set of the gradation values of R, G and B is stored corresponding to a set of gradation values of C, M, Y and K having a slightly great bluish color. When the color conversion processing is carried out by using the color conversion tables consequently, the conversion from RGB image data to CMYK image data is performed, and at the same time, the bluish color of the image is increased. As a result, it is possible to obtain CMYK image data having a slightly bluish color. As a matter of course, also in the case in which the color conversion processing is carried out by using the color conversion table, the RGB values of an original image are basically replaced with the CMYK values in the same manner as in an ordinary color conversion table. Therefore, the CMYK image data obtained after the conversion have a slightly bluish color and basically have the same content as the original image.

Accordingly, the CMYK image data thus obtained are subjected to the picture drawing for causing the original image to be bluish. Thus, it is also possible to carry out picture drawing by using the special color conversion table set depending on the picture drawing. In the image print processing according to the first variant, therefore, it is possible to print an image through favorite picture drawing of a user by recording the color conversion table on a picture drawing code of a sample image and reading and using the same color conversion table.

It is also possible to record, on the picture drawing code, a correcting amount for the color conversion table prestored in the printing apparatus 10 (see the Step S104 in FIG. 5) in place of the color conversion table itself. Also in the case in which an amount of information which can be recorded on a two-dimensional code is small and the color conversion table cannot be recorded, consequently, it is possible to carry out the picture drawing by correcting and using the color conversion table which is prestored. For example, in the case in which a picture having an yellowish color is to be drawn, it is preferable to record a correcting amount for a gradation value of a Y component as the picture drawing information, to correct the gradation value of the Y component in the color conversion table in accordance with the read correcting amount and to then use the color conversion table.

When the color conversion table is read, a processing of selecting image data to be printed is then carried out (Step S302 in FIG. 11). The image data may be stored in the computer 30 or the external storage device 32 or be stored in the digital camera 20 connected to the printing apparatus 10. A user manipulates the operation panel 300, thereby selecting any of the image data which is to be printed. When the image data are selected, a resolution conversion processing is carried out over the image data (Step S304) to convert a resolution of the image data into a print resolution. A color conversion processing is carried out over the image data subjected to the resolution conversion by using the color conversion table read previously (Step S306).

As described above, in the color conversion table read processing, the color conversion table is read through a picture drawing code of a sample image selected by the user.

The color conversion table is set depending on the picture drawing carried out by a photographer or a designer in order to finish a sample image. By carrying out the color conversion processing using the color conversion table, accordingly, it is possible to convert the image of the user into image data (CMYK image data) on the same picture drawing as the sample image. Based on the CMYK image data thus obtained, then, a halftone processing (Step S308), an interlace processing (Step S310) and a dot formation processing (Step S312) are executed respectively so that the image of the user can be printed through the same picture drawing as a work of the photographer.

In the image print processing according to the first variant, thus, the color conversion processing is carried out by using the color conversion table read from the picture drawing code of the sample image so that the image of the user can be printed through the same picture drawing as the sample image.

For this purpose, it is sufficient that the user simply selects a favorite sample image and sets the same sample image onto the scanner portion 100. Therefore, it is possible to easily print an image through the favorite picture drawing. When selecting the sample image, moreover, it is sufficient that the user simply selects his (her) own favorite image and any of knowledges and experiences related to the picture drawing are not required. Accordingly, a general user having node tailed knowledge related to the picture drawing can easily print an image through favorite picture drawing. Furthermore, it is possible to simultaneously carry out the picture drawing processing and the color conversion processing by carrying out the picture drawing through the color conversion table.

Therefore, it is possible to process image data and to output a printed image more rapidly.

E. Second Variant:

As described above, in the example, the user can obtain a preferred picture drawing image by selecting a favorite one of the sample images and causing the printing apparatus 10 to read a picture drawing code thereof. The sample image selected by the user is printed on a print paper as illustrated in FIG. 6. In the image printed on the print paper, generally, a coloration of the print paper slightly influences an impression of the image in some cases. For example, in some cases in which the sample image is printed on a print paper having an ivory color, it has a slightly yellowish impression. To the contrary, in the case in which the sample image is printed on a pale print paper, it has a slightly bluish impression.

The sample image selected by the user is also printed on the print paper. For this reason, the impression of the sample image felt to be preferable by the user does not only depend on the picture drawing given to the sample image but is influenced by the coloration of the print paper in some cases.

In these cases, the user sees the printed sample image (that is, a sample image influenced by the print paper) and feels it to be preferable. Therefore, it is possible to suppose that a sample image subjected to the favorite picture drawing for the user is obtained through both the picture drawing processing given to the sample image and the coloration of the print paper. Therefore, it is possible to print the image of the user through the favorite picture drawing more closely to the impression of the sample image by carrying out a processing of reflecting the coloration of the print paper of the sample image on the image of the user in addition to the execution of the same picture drawing processing as that for the sample image.

Figure 13:
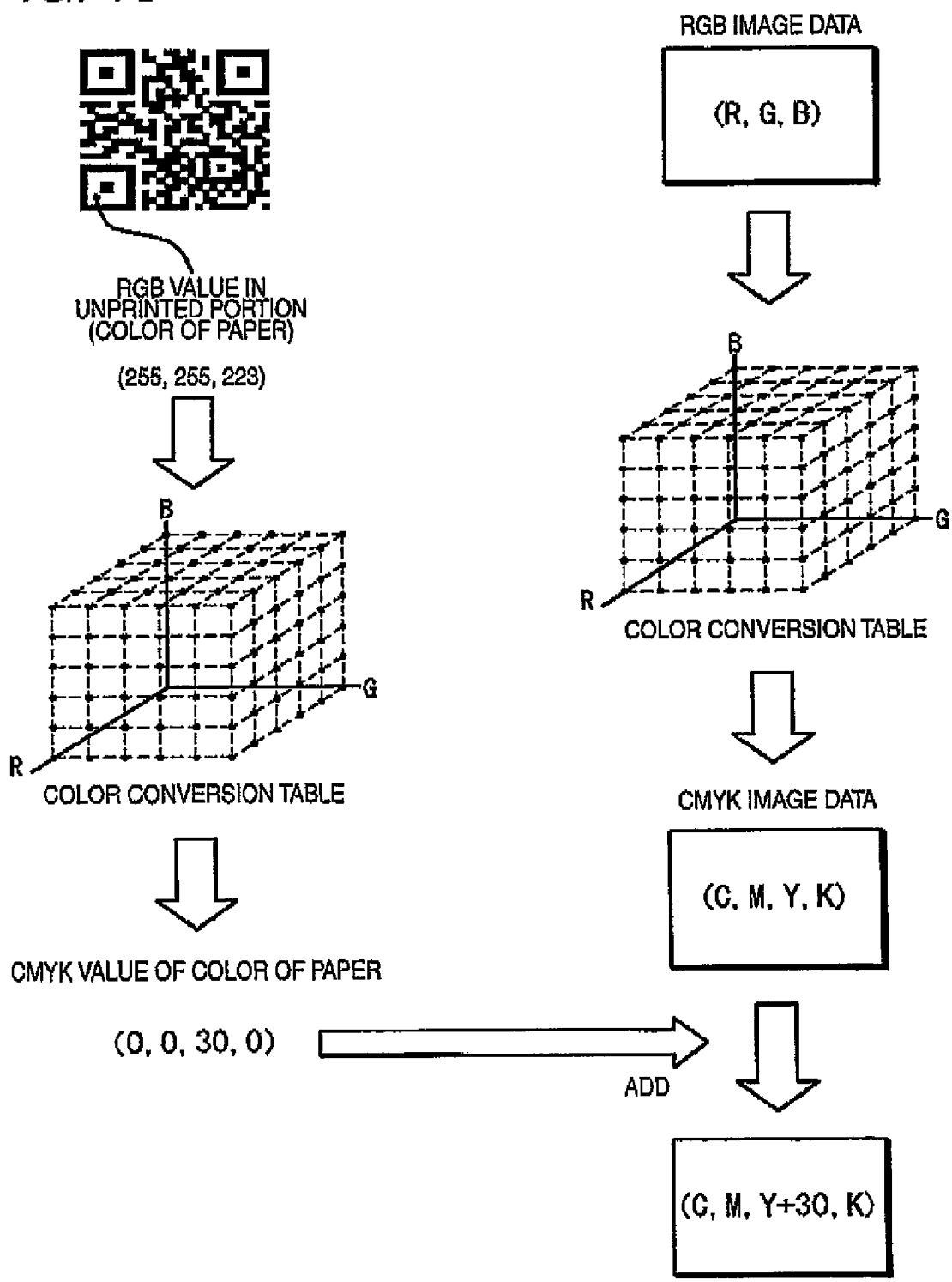
FIG. 13 is an explanatory view conceptually showing a state in which a coloration of a print paper having a sample image printed thereon is reflected on the picture drawing processing.

FIG. 13 is an explanatory view conceptually showing the processing of reflecting the coloration of the print paper of the sample image on the image of the user. The image data obtained by reading the picture drawing code of the sample image through the scanner portion 100 in the picture drawing processing according to the example (see FIG. 7) are shown in an upper left part of FIG. 13 (see the Step S202 in FIG. 7). As described above, the scanner portion 100 acquires the picture drawing code as RGB image data. For this reason, the RGB image data thus acquired also include data in a non-printed portion (see FIG. 13). By acquiring the RGB values in an unprinted portion from the image data obtained by the scanner portion 100, it is possible to know a ground color of the print paper as the RGB values.

When the RGB values of the ground color of the print paper are acquired, subsequently, the RGB values of the ground color are converted into the CMYK values by referring to the color conversion table (a drawing on a left side of FIG. 13).

FIG. 13 illustrates RGB values and CMYK values in the case in which a slightly yellowish print paper is used. In the example, as shown in a lower left part of FIG. 13, the CMYK values of the print paper are (0, 0, 30, 0) and have a Y component (a yellow component).

On the other hand, the image data of the user are converted into CMYK image data through the color conversion processing (see the Step S104 in FIG. 5) (a drawing on a right side of FIG. 13). By using the CMYK values of the print paper which have already been obtained, the CMYK values of the image of the user are corrected. There are various correcting methods.

For simplicity, it is preferable that the CMYK values of the print paper should be added to the CMYK values of the image of the user. In the example of FIG. 13, the CMYK values (0, 0, 30, 0) of the print paper are added to the CMYK values of the image of the user so that a Y gradation value of the image of the user is increased (a drawing in a lower right part of FIG. 13). When an image is printed based on the CMYK values, consequently, a Y ink is used in a little large amount so that the image can be caused to have a yellowish color and an image can be printed in an impression tinged with the yellow color in the same manner as the sample image. If the ground color of the print paper of the sample image is checked and reflected on the image of the user, thus, it is possible to print the image of the user through picture drawing which is closer to the sample image.

When the RGB values of the color of the print paper are to be acquired, the RGB values of the print paper are not acquired from the image data fetched by the scanner portion 100 but the RGB values or the CMYK values of the color of the print paper may be recorded on a picture drawing code. Also in the case in which the sample image and the picture drawing code are printed separately and the different print papers are used for the sample image and the picture drawing code, thus, it is possible to acquire the color of the print paper for the sample image. For example, also in the case in which picture drawing codes of an inserted work are collectively inserted in an end of a photographical magazine or the case in which picture drawing codes of a work in a photographical magazine which has already been published are separately published later, it is possible to reflect a color of a print paper used in the work and to print the image of the user through closer picture drawing to an impression of the work.

Moreover, it is also possible to reflect, on the picture drawing, a ground color of a print paper to be used by the user in addition to the ground color of the print paper on which the sample image is printed. For example, in the case in which the user prints an image by using an ivory print paper, the image has an impression tinged with a yellow color as a whole. In order to cancel the impression, therefore, a correction for reducing a gradation value of a Y component (a yellow component) of the CMYK image data is carried out.

Thus, the tinge of the yellowish color of the ground color is cancelled with an image obtained after the correction. Consequently, it is possible to print an image having a closer impression to the impression of the sample image.

Information about the ground color of the print paper to be used by the user may be prestored in the printing apparatus 10 or the scanner portion 10 may be caused to read the print paper, thereby checking the ground color in the print. If the picture drawing is carried out based on the information, it is possible to perform the picture drawing in consideration of the influence of the print paper of the user in addition to that of the print paper of the sample image. Therefore, the image of the user can be printed more closely to the impression of the sample image.

Figure 14:
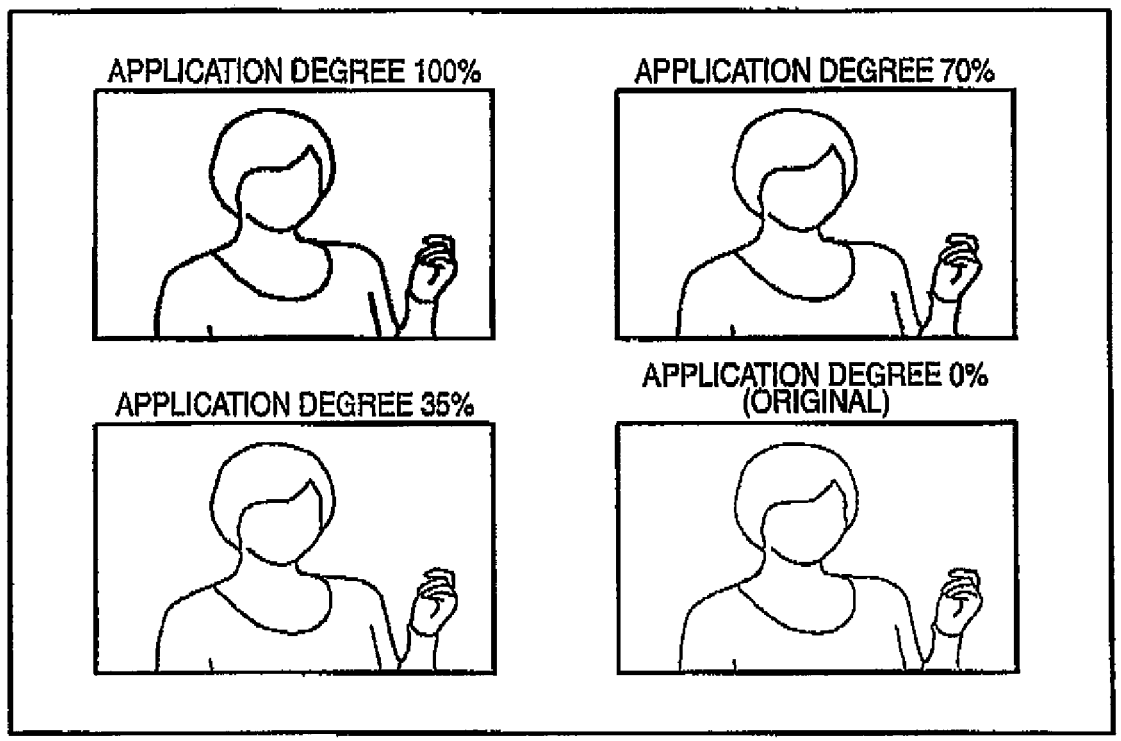
FIG. 14 is an explanatory view illustrating a state in which four images having different application degrees of picture drawing information are displayed on a display screen of an operation panel according to a third variant.

F. Third Variant:

In the printing apparatus 10 according to the example, when the picture drawing processing is to be carried out over the image of the user, the picture drawing of the sample image is not exactly applied to the image of the user but the user may be caused to select an application degree of the picture drawing of the sample image. FIG. 14 is an explanatory view illustrating a state in which four images having different application degrees of the picture drawing are displayed on the display screen of the operation panel 300 and the user is caused to select the application degree of the picture drawing.

An image displayed as an "application degree of 0% (original)" in FIG. 14 represents an original image which has not been subjected to the picture drawing. Moreover, an image in an upper left part which is displayed as an "application degree of 100%" is obtained by an exact application of the picture drawing for the sample image. By controlling the correcting amount to carry out the picture drawing in accordance with the picture drawing for the sample image, furthermore, it is also possible to obtain an intermediate image of the original image and the sample image. In FIG. 14, images having an "application degree of 70%" and an "application degree of 35%" are displayed corresponding to an extent that the picture drawing is applied.

When the picture drawing processing is carried out over the image of the user, images having some application degrees are displayed on the display screen of the operation panel 300. The user manipulates the operation panel 300 while seeing the images, thereby selecting an image having the most preferable application degree.

Thus, the picture drawing of the sample image is not only reflected exactly but can be reflected on the image of the user at a proper degree. Therefore, it is possible to print an image through picture drawing which is more coincident with the taste of the user. Moreover, it is sufficient that the user simply selects the most preferable one of the images displayed on the display screens. Thus, it is possible to easily specify more preferable picture drawing. Furthermore, the images having different application degrees of the picture drawing are displayed. Therefore, it is possible to recognize a state of a variation in the impression of the image in accordance with the application of the picture drawing of the sample image.

Consequently, a user who is interested in the picture drawing can learn the effect of the picture drawing processing from a work of a photographer that is used as the sample image, which is suitable.

Figure 15:
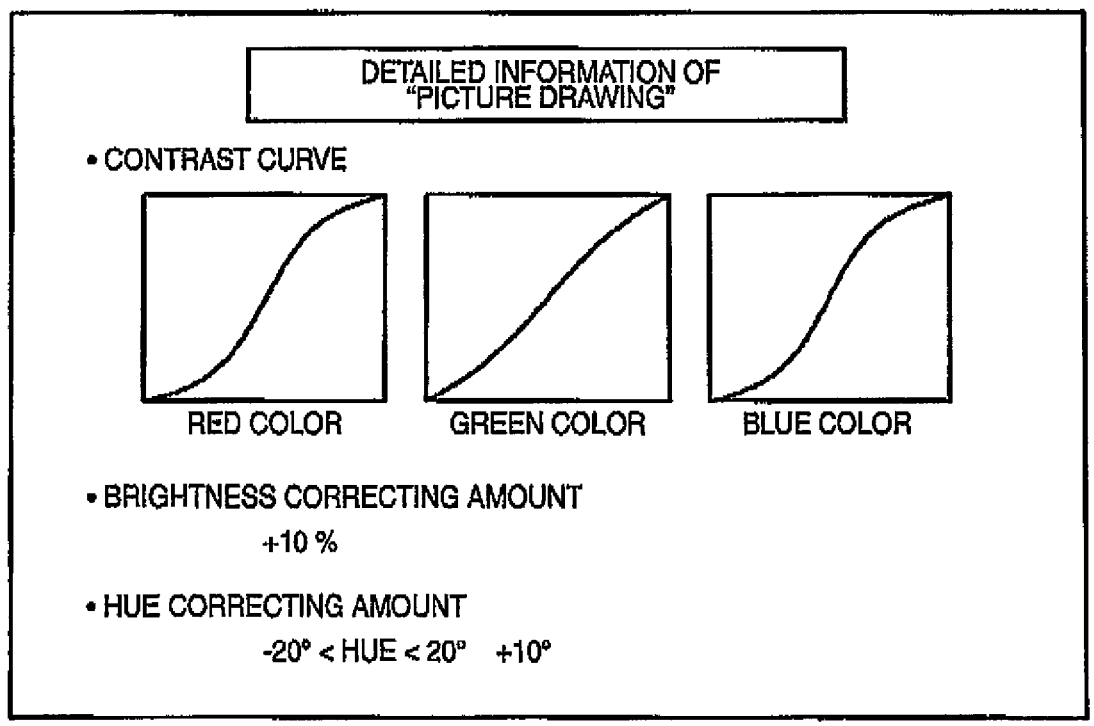
FIG. 15 is an explanatory view illustrating a state in which a content of picture drawing for a sample image is displayed on the display screen of the operation panel according to the third variant.

As illustrated in FIG. 15, furthermore, the content of the picture drawing of the sample image may be displayed on the display screen of the operation panel 300. Thus, it is possible to know which correction is carried out.

Consequently, a general user can apply the picture drawing of the sample image at ease. In addition, the user who is interested in the picture drawing can know more detailed information about the picture drawing of a photographer or a designer, which is suitable.

While the printing apparatus according to the example has been described above, the invention is not restricted to all of the example and variants but can be carried out in various manners without departing from the scope thereof.

According to an aspect of the invention, a sample image (an image) output together with a picture drawing code (a correction content describing image) is previously selected when the image data are to be corrected. It is possible to select any image to which the correction content describing image corresponds. For example, it is also possible to select a favorite one of images prepared previously as sample images or an image satisfied by chance to which the correction content describing image corresponds if any. Moreover, a manner in which the image is output together with the correction content describing image is sufficient if the image and the correction content describing image are output in a corresponding state to each other by any method, and the correction content describing image may be output to the outside of the column of the image or the correction content describing image may be output to the back face of the image in case of a printed image, for example. Furthermore, the correction content describing image may be printed on a separate page from a page of a magazine on which an image is printed. In this case, the image and the correction content describing image may correspond to each other by any method (the same serial numbers are given to the image and the correction content describing image, for example).

When the image output together with the correction content describing image is selected, the correction content describing image is read. The correction content given to the image output together is described in the correction content describing image. The correction content describing image may have any manner if the correction content given to the image output together is described therein, and can be a code graphic such as a bar code. When the correction content describing image is read, image data are corrected in accordance with the correction content described therein and are thus output.

Consequently, the correction content given to the corresponding image is described in the correction content describing image. Therefore, the image data are subjected to a correction having the same content as the corresponding image. If a user is caused to select a favorite picture drawing image and the correction content describing image corresponding to the same image is read, therefore, the same correction as that for the favorite image of the user is given to the image data so that the image data can be corrected into the favorite picture drawing image of the user and the image thus obtained can be then output. At this time, it is sufficient that the user simply selects the favorite image, and a knowledge related to the image correction is never required. Therefore, any general user having no special knowledge can correct the image data into the favorite picture drawing image very easily.

Moreover, the correction content of the image is described in the correction content describing image. For this reason, it is not necessary to separately store the content of the correction if there is the correction content describing image. Also in the case in which a large number of correction contents are prepared in advance, therefore, it is not necessary to maintain a large number of storage areas. Therefore, it is possible to prepare for a variety of correction contents in advance corresponding to the diversified taste of the user.

Consequently, it is possible to output a picture drawing image which is coincident depending on the taste of the user.

Moreover, it is also possible to read a correction content describing image coded into a state in which the correction content cannot be directly read.

More information than the correction content describing image describing the correction content in a direct readable state can be described in the correction content describing image thus coded. By describing the correction content of the image in more detail, therefore, it is possible to give a more proper correction to an image, thereby outputting a suitable image.

Furthermore, it is also possible to correct the image data and to convert a color system of the image data from a first color system to a second color system. In this case, moreover, the correction content describing image may describe information about the correction content of an image and the execution of the conversion from the first color system to the second color system.

By simply carrying out the correction processing over the image data having the first color system, consequently, it is possible to obtain the image data having the second color system. Accordingly, the processing of converting the color system into the second color system is not required after the correction is carried out. Therefore, it is possible to rapidly process an image. In addition, it is also possible to reduce a possibility that the image picture drawing might be finely influenced through the conversion of the color system.

Moreover, the image may be printed based on the image data obtained after the correction.

As a method of confirming or appreciating an image, for example, it is possible to employ various methods, for example, a display on a monitor. By printing and outputting an image, however, it is also easy to simply carry and appreciate the printed image or to distribute the printed image to other people. By printing the image based on the image data obtained after the correction, therefore, it is possible to easily utilize a suitable image.

Moreover, it is also possible to read information about the print medium together with the correction content describing image and to correct the image data in consideration of the information about the print media thus read. When reading the information about the print medium, it is also possible to describe the information about the print medium in the correction content describing image, thereby reading the same information together with the correction content describing image. In the case in which the correction content describing image is printed on the print medium, alternatively, it is also possible to directly acquire the information about the print medium from the print medium when reading the correction content describing image. The information about the print medium does not need to be always read simultaneously with the correction content describing image but the information about the print medium may be read after the correction content describing image is read. To the contrary, it is also possible to read the correction content describing image after reading the information about the print medium.

in some cases in which the image is printed on the print medium, a coloration of the image or an impression of the image is influenced by a ground color or a gloss of the print medium. By reading the information about the print medium together with the correction content describing image, therefore, it is possible to carry out, over image data, a correction which takes the influence of the print medium into consideration.

Thus, it is possible to correct and output the image more suitably.

Furthermore, the invention can also be implemented using a computer by causing the computer to read a program for realizing the image processing method and to execute a predetermined function.

By causing the computer to read the program and to implement each of the functions, it is possible to simply correct an image into a favorite picture of a user and to output the picture.

What is claimed is:

1. An image processing apparatus, comprising:
    a first reader, operable to read image data;
    a second reader, operable to read a first image printed on a medium on which a second image is printed, the second image being different from an image corresponding to the image data, and the first image describing a correction content which has been applied on the second image; and
    a corrector, operable to correct the read image data in accordance with the correction content described in the first image.

2. The image processing apparatus according to claim 1, wherein the correction content is described in the first image in a coded state in such a manner that a person cannot directly make a discrimination.

3. The image processing apparatus according to claim 1, wherein
    the corrector converts a color system of the image data from a first color system to a second color system, and
    information for correcting the image data and converting the color system is described in the first image.

4. The image processing apparatus according to claim 1, further comprising:
    an image printer, operable to print an image based on the corrected image data.

5. The image processing apparatus according to claim 1, wherein
    the second reader reads first information about the medium, and
    the corrector corrects the image data in consideration of the read first information.

6. The image processing apparatus according to claim 5, further comprising:
    an image printer, operable to print an image based on the corrected image data on a second medium, wherein
    the second reader reads the first information, and a second information about the second medium, and
    the corrector corrects the image data in consideration of the first information and the second information.

7. The image processing apparatus according to claim 1, wherein
    the second reader reads the first image on the medium as data that includes data of the first image and data of an unprinted portion of the medium on which the first image is not printed.

8. The image processing apparatus according to claim 1, wherein the corrector corrects the read image data in accordance with the correction content described in the first image by a degree which is adjusted by a user.

9. The image processing apparatus according to claim 1, wherein
    the second image is printed by using an ink, and
    the first image includes information about the ink.

10. The image processing apparatus according to claim 1, wherein
the first image includes information about the medium.

11. The image processing apparatus according to claim 1, wherein
the second image is printed by a printing apparatus, and
the first image includes information about the printing apparatus.

12. The image processing apparatus according to claim 1, wherein
the second image is photographed by a photographer, and
the first image includes information about the photographer.

13. The image processing apparatus according to claim 1, wherein the first image is a plurality of images which are related to the second image.

14. An image processing method, comprising:
reading image data;
reading a first image printed on a medium on which a second image is printed, the second image being different from an image corresponding to the image data and the first image describing a correction content which has been applied on the second image; and
correcting the read image data in accordance with the correction content described in the first image.

15. A non-transitory computer-readable recording medium in which a computer program causing a computer to execute the method according to claim 14 is recorded.

* * * * *